Nov. 7, 1933.  S. D. BUTTERWORTH  1,934,165
CAR LOADING DEVICE
Filed Jan. 13, 1932
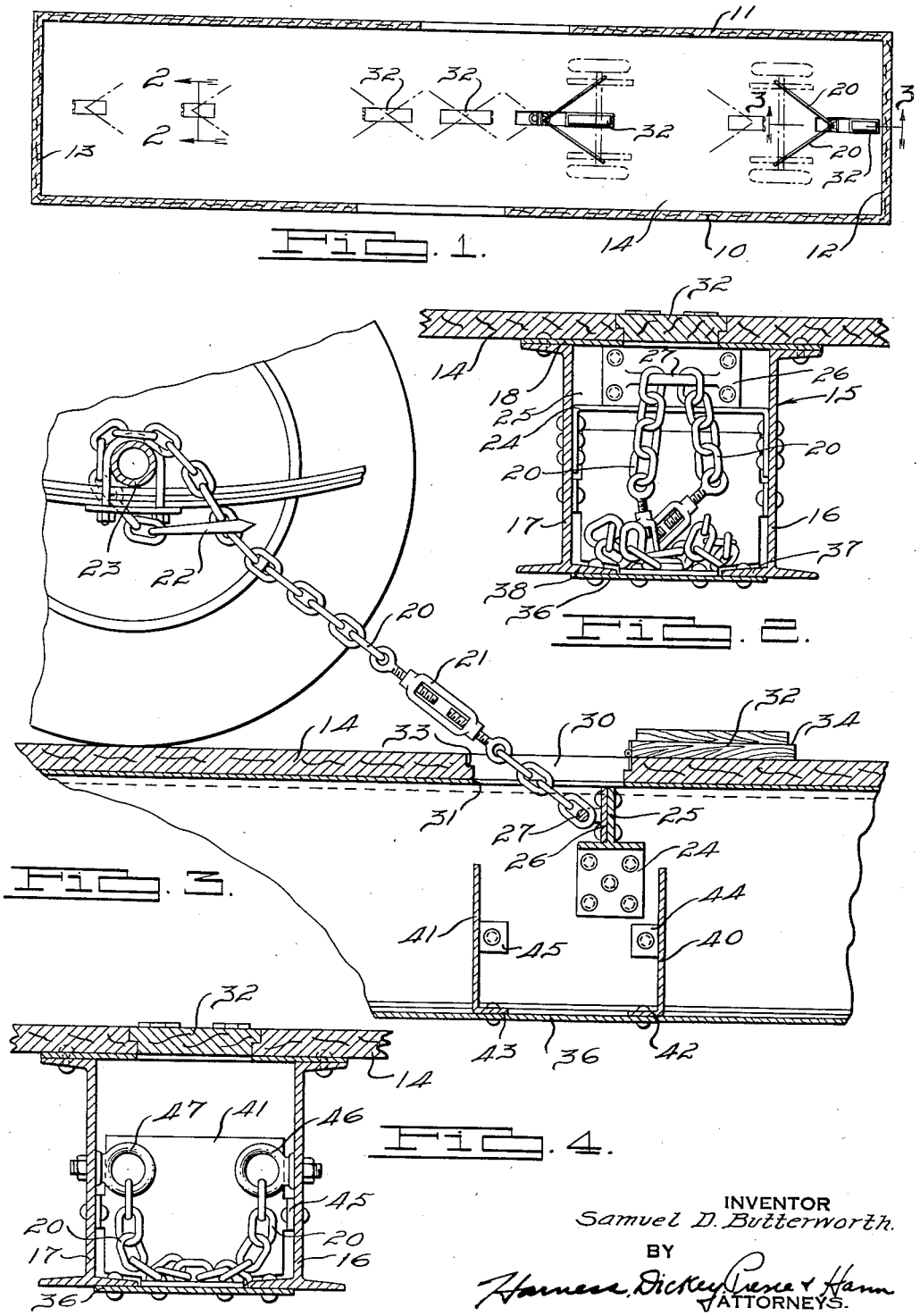
INVENTOR
Samuel D. Butterworth.
BY
Harness, Dickey, Pierce & Hamm
ATTORNEYS.

Patented Nov. 7, 1933

1,934,165

UNITED STATES PATENT OFFICE 1,934,165

CAR LOADING DEVICE

Samuel D. Butterworth, Detroit, Mich., assignor, by mesne assignments, to The Worth Company, a corporation of Michigan Application January 13, 1932. Serial No. 586,318

19 Claims. (Cl. 105—368)

The invention relates to loading devices and it has particular relation to devices for loading automobiles in freight cars or the like for transportation purposes.

One object of the invention is to provide a car loading device which may be secured to a girder or beam extending under the floor of a freight car or the like, and be accessible through an opening in the floor. In most constructions that have been used for loading automobiles in freight cars and the like, it has been customary to fasten or anchor the car loading members directly to the wooden floor.

Another object of the invention is to provide a car loading device anchored to a beam or girder under the floor and accessible through an opening therein, which may be disposed below the floor in an out-of-the-way position when it is not in use. In this connection it may be stated that it is desired to employ a closure for the opening in the floor to present a smooth and flush floor surface when the car loading device is not in use, and by providing a car loading device which may be disposed in an out-of-the-way position entirely below the floor, the opening in the floor may be closed more satisfactorily, inasmuch as it is not necessary to provide any space in the floor proper for disposing the loading devices in out-of-the-way positions.

Another object of the invention is to provide a floor construction in combination with a car loading device, in which a housing is provided below the lower surface of the floor for receiving the car loading device and to which access may be had by means of an opening in the floor, to permit drawing the car loading device through such opening when it is desired to use it for loading an automobile in the car.

Another object of the invention is to provide a housing of the above designated character, which is in the form of a box girder under the floor and to which the car loading devices are anchored.

And, in general, it is the object of the invention to provide anchoring and housing means below the floor of the freight car, which preferably comprises an ordinary box girder employed for supporting the floor, and which is accessible through openings in the floor to permit drawing the loading devices into the car where they are to be used.

Other objects of the invention will be apparent from the following description, the drawing relating thereto, and the claims hereinafter set forth.

For a better understanding of the invention, reference may be had to the accompanying drawing forming a part of this specification, wherein:

Figure 1 is a longitudinal cross-sectional view of a freight car illustrating an arrangement of car loading devices accoording to one form of the invention;

Figure 2 is a cross-sectional view on a larger scale taken substantially along the line 2—2 of Figure 1;

Figure 3 is a cross sectional view on a larger scale taken substantially along the line 3—3 of Figure 1;

Figure 4 is a cross-sectional view similar to Figure 2, but illustrating a different form of the invention.

Referring to Figure 1, the numerals 10 and 11 indicate respectively, opposed side walls of a freight car, while the end walls are indicated at 12 and 13. The floor of the car is indicated at 14, and as best shown by Figures 2, 3 and 4, is constructed of wood planking. Practically all freight cars are constructed with wooden floors, although the frame work of the car may be constructed of steel, and ordinarily, steel beams or girders extend under the floor for supporting the latter, as well as more rigidly completing the frame. In the car illustrated, a box girder 15 extends centrally of the car and longitudinally under the floor. This girder comprises two spaced channel irons 16 and 17 which preferably are connected at the top by means of an elongated metal plate 18. This plate not only serves to connect the irons but additionally increases the area of floor directly supported by the girder.

For anchoring an automobile to the girder, an anchoring device is provided which, as shown particularly by Figure 3, may comprise a chain 20 having a turn buckle 21 intermediate its ends and a hook 22 at one end. This end of the chain may be looped around an axle 22 and the hook then engaged with a link in the chain. The opposite end of the chain is anchored to the girder 15 in the following manner.

As shown best by Figures 2 and 3, a bracket iron 24 is riveted at opposite ends to the channel irons 16 and 17 and on its upper side is provided with a leg 25. A metal plate 26 is riveted to the leg 25, and such plate is provided with a metal loop 27 which serves to connect the lower end of the chain 20 to the bracket plate 24 and hence to the girder. Preferably, two of the chains 20 will be employed in connection with each loop 27, such chains respectively extending to opposed ends of the axle of the automobile adjacent thereto. The chains in their operative positions extend through an opening 30 in the wooden floor of the car, which coincides with an opening 31 in the metal plate 18 connecting the upper ends of the channel irons. This opening 30 in the wooden floor is adapted to be closed by a hinged wooden closure 32 and in order to support the closure in the opening, the side of the opening may have a shoulder 33 adapted to engage a complementary shoulder 34 on the edge wall of the closure. When the chains are not to be used, they can be slipped down through the openings 30 and 31 and the closure 32 then may be moved into its closed position and then the floor of the freight car will be smooth and uninterrupted, from which it follows that it may be used in the ordinary manner.

For completely housing the chains when they are below the floor 14, the channel irons 16 and 17 may be connected at the bottom by a cover plate 36 and in the construction shown the marginal portions of this plate are connected to additional legs 37 and 38 projecting toward each other from the base of the channel irons. The plate 36 may extend partially or entirely of the length of the channel irons, but in either event, to prevent sliding and scraping of the chains during acceleration and deceleration of the freight car movement, it is preferred to use vertically arranged cross plates 40 and 41 to limit the length of each chain housing portion of the girder, although it should be understood that such plates may be omitted if desired. These plates have inturned lips 42 and 43 connected to the plate 36, and side lips 44 and 45 connected to the bases of the channel irons 16 and 17. The plates, in conjunction with the channel iron bases and the cover plate 36, provide a short housing for the chains and such chains may be disposed in such housing as shown clearly by Fig. 2.

If desired, the chains 20 may extend from opposed sides of the metal bracket plate 24 and in this event preferably two metal loops 27 would be provided at opposite sides of the leg 25. Preferably, in this case the opening 30 would be longer for permitting the chains to extend upwardly in diverging relation and also the plate 40 would be disposed farther to the right to provide more room for manipulation of the chains at opposite sides of the metal bracket plate.

The construction shown by Fig. 4 is very similar to that shown by Fig. 2 with the exception that the metal bracket plate 24 has been eliminated and instead of such plate, eye bolts 46 and 47 are secured to the bases of the channel irons with the eye portions interiorly of the girder.

From the above description it will be apparent that a novel and efficient arrangement is provided for storing and anchoring car loading devices below the floor of a freight car or the like. Particularly, it will be apparent that the means provided for housing and anchoring such loading devices comprises a box girder forming a part of the freight car construction and, hence, the devices may be associated with the car with but little additional expense. It is apparent that car loading devices so anchored to a freight car girder will have a firm and rigid anchoring base which will relieve the wooden floor of any stress that might otherwise be imparted to it if the loading devices were anchored directly thereto. It is apparent that by housing the anchoring devices below the wooden floor, and providing a wooden cover for the opening in the latter, the floor will practically be the same as if no loading devices were present, and the average person would scarcely be aware of the covers, when in closed position. By using a box girder having its lower side closed, either partially or throughout its length, it is manifest that the anchoring devices connected to the girder, when disposed below the freight car floor, will not hang below the girder and that such anchoring devices will always be in a position where they can be reached through the openings in the wooden floor. The arrangement is highly efficient because it reduces initial equipping expenses, and is practically free of possible breakage or other disarrangement. The provision of chains or other flexible elements having adjusting devices, permits positioning automobiles in the freight car in various positions, although preferably sets of chains will be anchored at various places along the girder as illustrated, for example, in Fig. 1, to avoid as much as possible any great adjusting of the chain length. The adjusting feature in the chain or flexible element may also be used for tightening the automobile to the floor as well as adjusting it in position.

Although more than one form of the invention has been described and shown in detail, it will be apparent to those skilled in the art that various modifications may be made without departing from the scope of the appended claims.

I claim:

1. In combination, a freight car floor or the like having an opening therein, a box girder extending under the floor and beneath the opening, and flexible loading devices anchored to the girder and adapted to project through the opening and into the car above the floor.

2. In combination, a freight car floor or the like having an opening therein, a box girder extending under the floor and under the opening therein, and flexible loading devices anchored within the girder and housed thereby.

3. In combination, a freight car floor or the like having longitudinally spaced openings therein, a box girder extending under the floor and under such openings, and anchoring devices within such girder adjacent each of the openings in the floor.

4. In combination, a freight car floor or the like having an opening therein, a box girder extending under the floor and under the opening therein, eye means operatively connected to the girder and located therewithin, and flexible anchoring devices connected to such means and housed within the girder when not in use.

5. In combination, a freight car floor or the like having an opening therein, a box girder extending under the floor and under the opening, an eye member extending transversely across the girder, and anchoring devices connected to such eye member and housed within the girder.

6. In combination, a freight car floor or the like having an opening therein, a pair of beams extending under the floor with the opening in the latter coinciding with the opening between the beams, means at least partially closing the opening between the beams at the bottom thereof, and car anchoring devices below the opening in the floor and housed by the beams and bottom closing means.

7. In combination, a freight car having a floor or the like provided with an opening, a box girder extending longitudinally under the floor and under the opening, and anchoring devices in such girder and accessible through such opening in the floor.

8. In combination, a freight car floor or the like having an opening therein, a box girder extending longitudinally under the floor and under such opening, and an anchoring device disposed in such girder and anchored at one end thereto, and being adapted to project through such opening in the floor when in its operative position.

9. In combination, a freight car having a floor or the like provided with an opening, a box girder extending longitudinally under the floor and under the opening therein, an anchoring device within the girder and accessible through such opening in the floor, and closure means for such opening to present, when in closed position, a substantially smooth and flush upper floor surface.

10. In combination, a freight car floor or the like having a box girder extending longitudinally thereunder, said floor having an opening communicating with the interior of the girder, and anchoring devices adjustable in length anchored at one end in the girder and accessible through such opening in the floor.

11. In combination, a freight car floor or the like having an opening therein, a box girder extending longitudinally under the floor and under the opening, an eye bolt connected to the girder and having its eye portion disposed therewithin, and an anchoring device accessible through the opening in the floor and anchored to such eye bolt.

12. In combination, a freight car having a floor provided with an opening, a flanged metal beam extending under the floor adjacent the opening, means fastened to the beam to provide a housing under the opening, and an anchoring device operatively secured to the beam and adapted to project through the opening in the floor for securing objects thereto.

13. In combination, a freight car floor or the like having an opening therein, a beam extending longitudinally under the floor adjacent the opening and forming a part of the car frame to withstand longitudinal strain imparted to the car, and anchoring means operatively connected to the beam and adapted to project through the opening in the floor, for engagement with a vehicle or the like to hold the latter in position, the anchoring of the anchoring means to the beam serving to impart substantially all strain resulting from tendency of the vehicle or the like to move longitudinally in the freight car, directly to the beam which is particularly adapted to withstand such longitudinally directed strain.

14. In combination, a freight car or the like having a floor provided with an opening, a beam extending under the floor and forming a part of the car frame, and anchoring means operatively connected to the beam and adapted to pass through the opening for anchoring objects in the car, the arrangement being such that the beam takes substantially the entire strain and particularly during any tendency of the object to move in the car during transportation.

15. In combination, a freight car or the like having a floor provided with an opening, a beam extending under the floor and forming a part of the car frame, housing means operatively connected to the beam adjacent the opening, and anchoring means operatively connected to the beam, and adapted to project through the opening for securing an object in the car, and to be disposed in the housing when not in use, the arrangement being such that the beam takes substantially the entire strain and particularly during any tendency of the object to move in the car during transportation.

16. In combination, a freight car or the like having a floor provided with an opening, a beam extending under the floor and forming a part of the car frame, and anchoring means operatively connected to the beam and adapted to pass through the opening for anchoring objects in the car, the arrangement being such that the beam takes substantially the entire strain and particularly during any tendency of the object to move in the car during transportation, said anchoring means comprising a flexible member.

17. In combination, a freight car or the like having a floor, a beam extending under the floor and forming a part of the car frame, means adapted to hold an object in the car above the floor, and means connecting the first means to the beam so that the beam takes substantially the entire strain and particularly during any tendency of the object to move in the car during transportation.

18. In combination, a freight car or the like having a floor, a beam extending under the floor and forming a part of the car frame, flexible means adapted to hold an object in the car above the floor, said flexible holding means being attached to said car beam so that the beam takes substantially the entire strain and particularly during any tendency of the object to move in the car during transportation.

19. In combination, a freight car or the like having a floor, a beam extending under the floor and forming a part of the car frame, flexible means adapted to hold an object in the car above the floor, said flexible means being attached to the beam, so that the beam takes substantially the entire strain and particularly during any tendency of the object to move in the car during transportation, and means for housing the flexible means below the upper surface of the floor, when not in use.

SAMUEL D. BUTTERWORTH.